United States Patent [19]

Anderson et al.

[11] 4,266,444
[45] May 12, 1981

[54] HIGH-LOW SPEED ROTARY DRIVE MECHANISM

[75] Inventors: Ronald B. Anderson, Plymouth; Walter W. Svendsen, New Brighton; Gary H. Beckley, Roseville; Clifford Caneer, Jr., Anoka, all of Minn.

[73] Assignee: Longyear Company, Minneapolis, Minn.

[21] Appl. No.: 48,490

[22] Filed: Jun. 14, 1979

[51] Int. Cl.³ .......................... F16H 37/06; E21B 3/00
[52] U.S. Cl. ................................... 74/661; 74/665 C; 74/130; 81/57.14; 81/57.22; 81/57.3; 81/57.39; 173/164; 192/46
[58] Field of Search ................. 81/57.15, 57.16, 57.14, 81/57.3, 57.31, 57.33, 57.39, 57.22; 173/164, 163; 74/661, 665 A, 665 B, 665 C, 665 D, 665 E, 130; 192/46, 43.2

[56] References Cited

U.S. PATENT DOCUMENTS

| | | | |
|---|---|---|---|
| 1,951,875 | 3/1934 | Laabs | 74/661 |
| 2,019,814 | 11/1935 | Holmes et al. | 279/4 |
| 3,330,164 | 7/1967 | Wilson | 74/665 B |
| 3,390,728 | 7/1968 | Bartos | 173/163 |
| 3,518,903 | 7/1970 | Ham et al. | 81/57.16 |
| 3,625,095 | 12/1971 | Barnett et al. | 81/57.22 |
| 3,873,069 | 3/1975 | Sprague | 74/661 |
| 3,920,087 | 11/1975 | Hisey et al. | 173/164 |
| 3,972,242 | 8/1976 | Hunt | 81/57.39 |
| 4,084,429 | 4/1978 | Boland | 81/57.16 |
| 4,147,215 | 4/1979 | Hodge et al. | 81/57.16 |

Primary Examiner—C. J. Husar
Assistant Examiner—Philip W. Thor
Attorney, Agent, or Firm—Clayton R. Johnson

[57] ABSTRACT

High-low speed rotary drive mechanism for rotatably driving driven elements of a tool, for example a hydraulic chuck, while permitting axial movement of the driven elements relative thereto, said mechanism including a housing, a tubular spindle rotatably mounted by the housing top and bottom walls, drive lugs joined to the spindle inner peripheral wall for driving the driven elements, an axially lower main drive gear fixed to the spindle to drive the spindle, a reversible hydraulic motor mounted on the housing for driving the main drive gear at high speed, low torque, an upper gear mounted on the spindle between the lower gear and the top wall for rotation relative the spindle, an elongated rack having teeth intermeshing with the upper gear for driving the upper gear at high torque, low speed, and a poppet type ratchet assembly mounted by the upper gear to rotate therewith. The ratchet assembly includes a ratchet member that in one angular position relative the upper gear is axially movable into a lower gear aperture to transmit a driving force from the upper gear when the upper gear is driven in one angular direction and permit the upper gear rotating relative the lower gear in the opposite angular direction, and a second angular position axially movable into a lower gear aperture to transmit a driving force to the lower gear when the upper gear is driven in the opposite angular direction.

19 Claims, 4 Drawing Figures

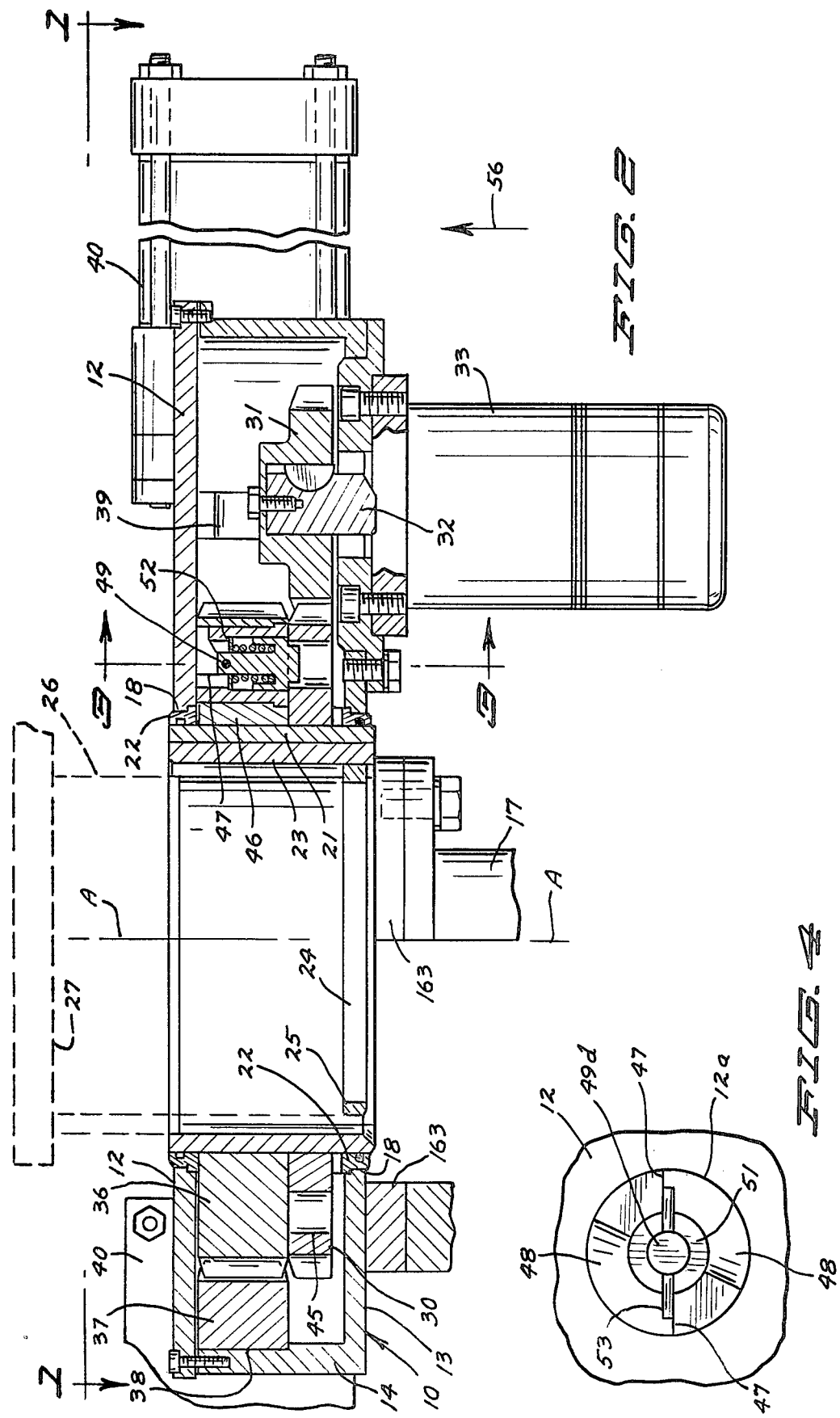

HIGH-LOW SPEED ROTARY DRIVE MECHANISM

BACKGROUND OF THE INVENTION

Rotary drive apparatus for selectively driving a tool at high torque, low speed and low torque, high speed that is used in making up and breaking out rod joints of, for example, a drill stem.

In the prior art, for example see U.S. Pat. No. 3,625,095 to Barnett et al, it is old to provide power driven pipe tongs for making up and breaking out joints of a drill stem and which are capable of spinning a pipe at high speed, low torque and at low speed, high torque. The Barnett apparatus includes a piston cylinder combination and hydraulic motors to provide the sources of power. However, the construction thereof is relatively complex.

U.S. Pat. No. 3,518,903 to Ham et al discloses a power tong assembly and a dependingly mounted backup tong assembly, the power tong assembly being powered by a hydraulic motor and the backup assembly by a piston cylinder combination. In U.S. Pat. No. 2,019,814 to Holmes et al there is disclosed a chuck having a gear toothed ring intermeshing with a rack that is reciprocated by a piston cylinder combination.

In order to provide a single unit of relatively simple construction that has a constant horsepower producing multitorque and multi-speed output, this invention has been made.

SUMMARY OF THE INVENTION

Apparatus for drivingly rotating a driven member that includes a housing, a first ring gear rotatable mounted in the housing, a second ring gear mounted on the first ring gear for rotation relative thereto, a rack powered by a piston cylinder combination to drivingly rotate the second ring gear, a hydraulic motor to drivingly rotate the first ring gear and an overriding ratchet assembly mounted by one of the ring gears for transmitting a rotary driving force in one angular direction from the one ring gear to the other when the one ring gear is drivingly rotated in one direction and permit the other ring gear being drivingly rotated relative the one ring gear in said one angular direction.

One of the objects of this invention is to provide a new and novel means for initially developing a high torque in a driven member for initial rod joint breaking and making with a low speed and then a low torque at a high speed. Another object of this invention is to provide a rotary drive mechanism having a high speed, low torque first power operated ring gear and a low speed, high torque second power operated ring gear, new and novel means for providing a smooth interface between the two modes of drive. A further object of this invention is to provide a new and novel hollow spindle spline type drive permitting free axial movement of the driven member and alternately providing a high speed, low torque and a low speed, high torque drive to the driven member.

BRIEF DESCRIPTION OF THE DRAWINGS

FIG. 1 is a plan view of the apparatus of this invention with parts thereof broken away to show other structural features, said view being generally taken along the line and in the direction of the arrows 1—1 of FIG. 2 and showing elements that are to be driven thereby in cross section;

FIG. 4 is a fragmentary plan view with the housing closure plug removed to show the ratchet assembly.

Figures 2, 3:
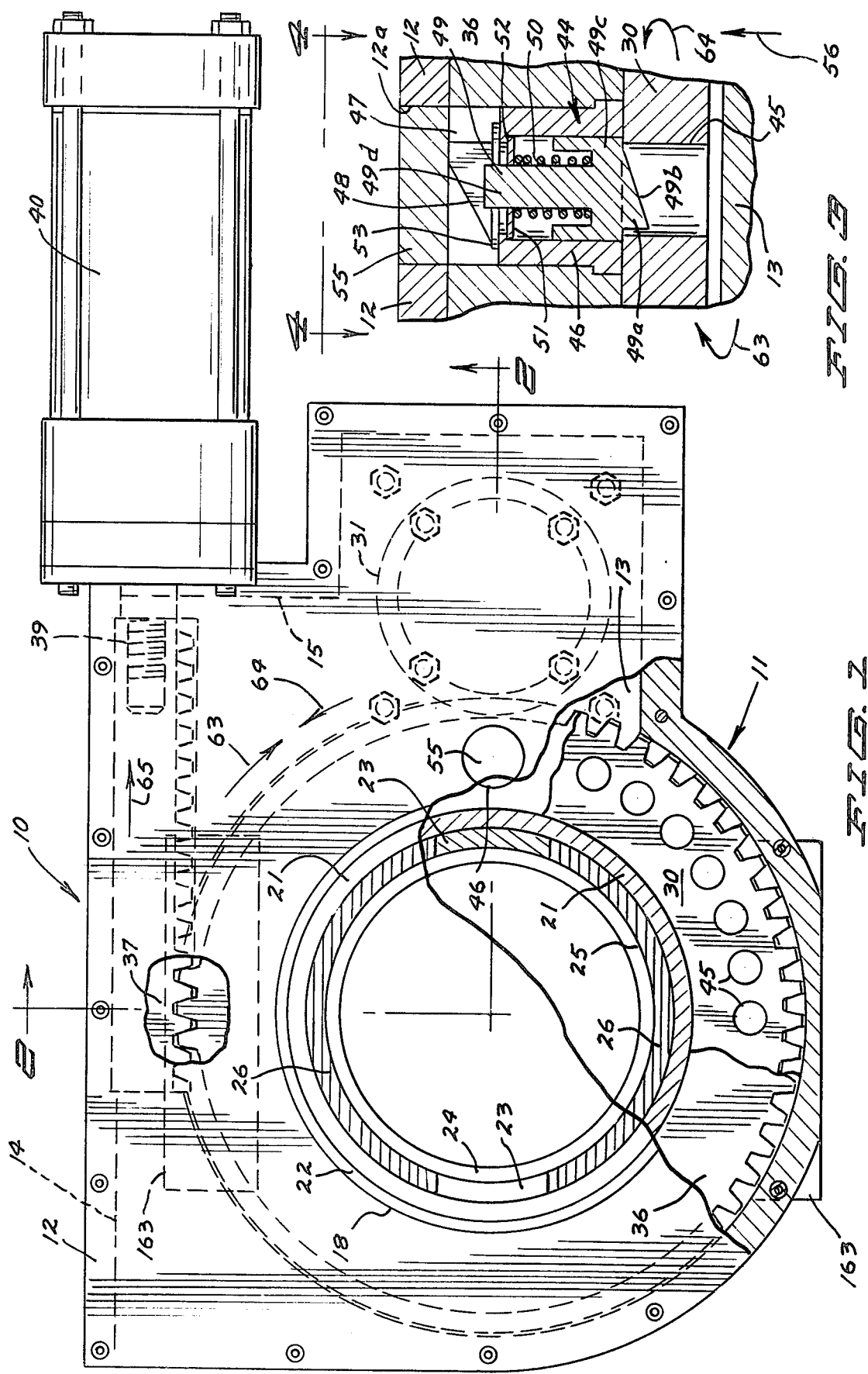
FIG. 2 is a cross sectional view generally taken along the line and in the direction of the arrows 2—2 of FIG. 1, said view also in part diagrammatically showing a tool to be driven in dotted lines.
FIG. 3 is a fragmentary cross sectional view generally taken along the line and in the direction of the arrows 3—3 of FIG. 2 to more clearly illustrate the ratchet assembly and the mounting thereof.

The high-low speed rotary drive mechanism, generally designated 10, includes a housing, generally designated 11. The housing 11 includes a removable top closure 12, a bottom wall 13, a side wall 14, and an end wall 15. Axially aligned apertures 18 are provided in the closure and bottom wall to mount other structure to be described and for having a drill rod extended therethrough. Mounting bars 163 are secured to the bottom wall on opposite sides of the bottom wall aperture, the mounting bars being secured to legs or arms 17 which may be secured to the clamp apparatus described in co-pending application Ser. No. 48,488 or co-pending application Ser. No. 48,489. It should be understood that the housing may be mounted in a conventional manner on other structure used in drilling.

Bearings 22 are provided in the axially aligned apertures in the closure and bottom wall 13 for mounting the tubular spindle 21 for rotation about a central axis A—A that would be coextensive with the axis of a drill rod extended through the axially aligned apertures of the closure and housing bottom wall. A pair of arcuate lugs 23 are welded or integrally formed with the inner peripheral wall of the spindle while a ring 24 is fixedly attached to the inner periphery of lugs. The axial height of the ring 24 is substantially less than the axial height of the spindle and is located near the lower end of the spindle. The spindle, lugs 23 and ring 24 bound a pair of diametrically opposite spaces 25 in which the driven elements 26 or other parts of the tool 27 to be driven are extended.

A main drive ring gear 30 is fixedly secured to the spindle 21 for driving the spindle, the drive gear extending radially outwardly of the spindle. The gear teeth of the drive gear 30 are in intermeshing relationship with those of the pinion gear 31 which is keyed to the shaft 32 of a reversible hydraulic motor 33 to be driven thereby. As may be noted from FIG. 2, the hydraulic motor is removably secured to the housing bottom wall with its shaft extending into the housing.

An upper ring gear 36 is mounted on the spindle for rotation relative thereto and is axially located between closure 12 and the lower gear 30. Cylinder 40 is fixably attached to housing end wall 15 and has a piston rod extended into the housing for reciprocating an elongated gear rack 37. The teeth of rack 37 are in intermeshing relationship with the teeth of the upper ring gear 36, a cut out 38 being provided in housing wall 14 and having the rack extended thereinto to retain the rack teeth in intermeshing relationship with the upper gear teeth as the rack is reciprocated.

For transmitting a driving force in one angular direction from gear 36 to gear 30 while permitting rotation of gear 36 relative to gear 30 in the opposite angular direction, without driving gear 30, there is provided a ratchet assembly, generally designated 44. The ratchet assembly includes an annular housing 46 that is pressed into a vertical aperture that extends through gear 36. The central axis of the ratched housing is radially spaced from and parallel to axis A—A. Axially reciprocally mounted in the ratchet housing is a ratchet member (plunger) 49 having a pawl portion 49a of a diameter to be extended into one of the apertures 45 formed in the main drive gear when an aperture 45 is axially aligned with the pawl portion. It is to be noted that the pawl portion has an inclined planar surface 49b that extends axially outwardly of the lower end of the main body portion 49c of the ratchet member so that as the gear 30 is driven angularly in one direction (arrow 63) relative to gear 36 the ratchet member is cammed out of the vertical aperture 45 (moved in direction of arrow 56) to permit the ring gear 30 rotating in one direction relative gear 36. However, if the gear 36 is being driven in the same angular direction at a higher speed than gear 30 (or gear 30 stationary), the pawl in extending into aperture 45 will drive gear 30 to rotate with gear 36. In this connection it is to be noted, there is provided a spring 50 having one end abutting against the ratchet member for resiliently urging it into an aperture 45, the opposite end of the spring bearing against washer 51 which in turn abuts against a downwardly facing annular shoulder 52 of the ratchet housing. To limit the downward movement of the plunger 49 (direction opposite arrow 56), the main body portion 49c thereof has an outer diameter larger than that of an aperture 45 so that when the pawl portion 49a extends into an aperture 45, the main body portion abuts against the top surface of ring gear 30. Surface 49b intersects with the lower surface of main body portion 49c, i.e. the pawl being of a cylindrical shape that is cut off along an inclined plane to provide the planar camming surface 49b.

To permit gear 30 being driven in the opposite angular direction (arrow 64) relative to gear 36 and alternately to permit gear 36 driving gear 30 in said opposite angular direction, the ratchet member is rotatable about its vertical axis angularly through 180 degrees relative to the ratchet housing. To retain the ratchet member in the selected one of its rotated positions, with the upper reduced diameter portion 49d thereof extended upwardly through washer 51, a pin 53 is extended through portion 49d into upwardly opening notches 47, 48 in the upper axial end of the ratchet housing.

Each notch is formed by a vertical (axial) wall 47 and an inclined wall 48, that is tapered axially downwardly toward the respective wall 47, the opposite ends of the pin extending into the apex portions of the notches when pawl portion 49a is extended into an aperture 45. However, when the pawl is cammed out of an aperture 45 the pin 53 is still axially below the top ends of walls 47 of the housing 46 and accordingly the ratchet member cannot rotate about its axis out of the position it is set in to a position surface 49b is 180° opposite its present position. When the ratchet member is cammed out of an aperture 45 the pin 53 can be manually grasped (or with an appropriate tool) and rotated about the ratchet member axis 180° degrees to the second of the ratchet member angular positions relative the gear 36. To facilitate rotating the ratchet member there is provided a removal plug 55 in aperture 12a of the closure 12 such as shown in FIG. 3.

The structure of this invention having been described, the use thereof will now be set forth. The hollow spindle 21 is rotated in a clockwise direction (arrow 63) as viewed from the top for screwing together threaded rod joints and conversely rotated in a counterclockwise direction (arrow 64) when unthreading joints. The driving torque is transmitted by lugs 25 to and through elements 26 to the jaw mechanism (not shown) of tool 27. Assuming the rod joints are to be threaded together, initially only a low torque is required and accordingly oil is ported to the hydraulic motor 33 to drive it in an appropriate direction so that gear 31 drives the ring gear 30 in the direction of the arrow 63. At this time the ratchet member 49 is set such that the part of the pawl portion that extends furthest axially remote from the main body portion 49c is located in a clockwise direction relative the remainder of the pawl portion. Accordingly, as long as the torque required to rotate the drive spindle is not too high, the hydraulic motor will cause the gear 30 to be rotated in a clockwise direction relative to gear 36. This relative rotation results in the ratchet member being continually cammed out of the apertures 45 of gear 30. However, once the torque requirements are greater than that provided by the hydraulic motor 33, fluid under pressure is applied to the one end of cylinder for reciprocating the rack 37 from a position to the left of that shown in FIG. 1 to the FIG. 1 position. This results in gear 36 being rotated in the direction of the arrow 63 relative to the now stationary gear 30 and as soon as the ratchet member is axially aligned with one of the apertures 45, the pawl portion thereof is resiliently urged into the aperture 45 for transmitting the driving force from the pawl portion to gear 30. Now gear 30 is rotated with gear 36 until the end of the stroke of the piston rod in the direction of the arrow 65. In the event the drill rod joint is still not sufficiently threaded, fluid under pressure is applied to the opposite end of the cylinder for moving the rack in the direction opposite the arrow 65. This results in the gear 36 being rotated in the direction of the arrow 64. Since the rotational force applied to the gear 36 is opposite that being provided to gear 30 by the hydraulic motor, the ratchet member is cammed out of aperture 45 (moved in the direction of the arrow 56), and gear 36 continues to rotate in the direction of the arrow 64. It is to be noted that due to the inclination of the surface 49, as the ratchet member moves axially in alignment with each of the adjacent aperture 45, it is cammed out of the respective aperture 45 in the manner previously indicated. At the end of the piston stroke, fluid is again applied to the one end of the cylinder for moving the rack in the direction of the arrow 65 for rotating gear 36 in the direction of arrow 63 and through the ratchet member rotate gear 30 in the same direction in the manner previously indicated.

Now in the event the spindle is to be rotated in the direction of arrow 64, the upper gear 36 is rotated to a position the ratchet assembly is below plug 55, and with plug 55 removed, the ratchet member is rotated 180° about its axis as previously indicated. Now the axially elongated part of the pawl portion 49a would bear against the counterclockwise portion of an aperture 45 when extended thereinto. Accordingly, when gear 30 is not rotating and the rack is to be removed in a direction opposite arrow 65 gear 36 would drive gear 30 in the direction of arrow 64. Further, when the rack is moved in the direction of the arrow 65, the gear 36 would be rotated in the direction of the arrow 63 whereby the ratchet member is cammed out of aperture 45, and accordingly the main drive gear 30 is not rotated.

Through the use of the apparatus of this invention the rack and piston cylinder combination provide a high torque with limited travel while the hydraulic motor provides a low torque, high speed for threading and unthreading rod joints. Additionally, the overiding ratchet assembly provides a smooth interface between the operating mode of high speed, low torque, and low speed, high torque for each angular drive direction. Additionally, through the provision of the arcuate spaces 25, the drive elements 26 for the tool 27 can move axially with the driven drill rod while the drive is being imparted thereto by the drive lugs 23 of the apparatus of this invention for rotating the drive elements 26 about the axis A—A. That is the drive elements 26 are axially movable relative the lugs 23, but cannot rotate relative lugs 23 as long as the drive elements extend to a lower elevation than the top of lugs 23.

What is claimed is:

1. Apparatus for use in drivingly rotating a driven member, comprising a frame, first annular means rotatably mounted on the frame for surrounding at least a part of the driven member, said first annular means having a first annular ring gear portion, a motor mounted on the frame and having a driven rotary motor shaft, means mounted on the motor shaft to drivingly rotate the ring gear portion, a ring gear mounted on the first annular means for rotation relative thereto, an elongated rack reciprocally mounted on the frame in driving engagement with the ring gear, piston cylinder means mounted on the frame for reciprocating the rack, and means mounted by the ring gear for rotation therewith for transmitting a rotary driving force in one angular direction from the ring gear to the gear portion when the ring gear is drivingly rotated in said one angular direction and permit said ring gear portion to be drivenly rotated relative the ring gear in said one angular direction and means on the annular means for drivingly rotating said driven member when the ring gear portion is drivenly rotated in said one angular direction.

2. The apparatus of claim 1 further characterized in that the annular means and ring gear have a common axis of rotation, that the ring gear portion is annular and that the inside diameter of the ring gear is substantially less than the maximum diameter of the ring gear portion, the ring gear having an annular part axially aligned with the ring gear portion.

3. The apparatus of claim 2 further characterized in that the means for transmitting a driving force is mounted by said annular part.

4. The apparatus of claim 1 further characterized in that the annular means has an inner circumferential wall and that the means for transmitting a driving force comprises a lug fixedly attached to the annular means to extend radially inwardly of the inner circumferential wall.

5. The apparatus of claim 4 further characterized in that the means for transmitting a driving force includes a second lug circumferentially spaced from the first mentioned lug and an annular ring mounted by said lugs that has an outer diameter that is substantially less than the inner diameter of the circumferential wall to provide at least two arcuate slots for having the driven member extended thereinto.

6. The apparatus of claim 1 further characterized in that the ring gear and ring gear portion are mounted to rotate about a common axis, that the ring gear portion has an axial drive aperture and that the means mounted by the ring gear comprises poppet means resiliently extended into said aperture for drivingly connecting the ring gear to the ring gear portion.

7. The apparatus of claim 6 further characterized in that the poppet means includes a plunger, means mounted on the ring gear for mounting the plunger for axial movement between a first position extended into said aperture and a second position outwardly of the aperture and means for resiliently urging the plunger toward its first position.

8. The apparatus of claim 7 further characterized in that the plunger has a main body and a drive part joined to the main body, and extendable into the ring gear portion to drive the ring gear portion, the main body at the juncture with the drive part being larger in cross section in a plane perpendicular to said common axis than said aperture to limit the distance the plunger extends into said aperture, and said drive part having a generally planar camming surface that axially diverges from the main body.

9. The apparatus of claim 8 further characterized in that the plunger mounting means mounts the plunger for rotation about an axis parallel to same common axis, the plunger and plunger mounting means having cooperating locking means for releasably retaining the plunger in one rotated position that when the plunger is in its first position the ring gear upon being drivingly rotated can drivingly rotate the ring gear portion in said one angular direction and another rotated position that when the ring gear is drivenly rotated relative the ring gear portion, the camming surface acting against the ring gear portion moves the plunger to its second position.

10. Apparatus for use in drivingly rotating a driven member, comprising a frame, annular means mounted on the frame to rotate about an axis of rotation for drivingly engaging the driven member, said annular means having a ring gear portion and an annular flange portion extending axially away from the ring gear portion, first power operated means for drivingly rotating said ring gear portion, a ring gear rotatably mounted on the annular flange portion and extending radially to at least in part be in axial alignment with the ring gear portion, second power operated means for drivingly rotating the ring gear, and axially movable means mounted by one of the ring gear and the ring gear portion for drivingly connecting the ring gear to the ring gear portion to rotate the ring gear portion when the ring gear is drivenly rotated in one angular direction and automatically breaking the driving connection when the ring gear is drivenly rotated in the opposite angular direction.

11. The apparatus of claim 10 further characterized in that power operated means for driving the ring gear comprises a rack mounted on the frame in driving engagement with the ring gear, and means for reciprocating the rack.

12. The apparatus of claim 10 further characterized in that the annular means includes a pair of lugs fixedly mounted on the annular flange to extend radially thereof to drivingly engage the driven member.

13. The apparatus of claim 12 further characterized in that the other of said ring gear and the ring gear portion has an aperture that the axially movable means is movable into to form a driving connection between the ring gear and ring gear portion when the ring gear is drivingly rotated in said one angular direction, said axially movable means having a camming surface to break the driving connection between the ring gear and ring gear portion when ring gear is drivingly rotated in said opposite angular direction.

14. The apparatus of claim 10 further characterized in that axially movable means includes a mount and means mounted by the mount for selectively adjustable movement between a first position for drivingly connecting the ring gear to the ring gear portion to rotate the ring gear portion when the ring gear is drivenly rotated in one angular direction and automatically breaking the driving connection when the ring gear is drivenly rotated in the opposite angular direction, and a second position for drivingly connecting the ring gear to the ring gear portion to rotate the ring gear portion when the ring gear is drivenly rotated in said opposite angular direction and automatically breaking the driving connection when the ring gear is drivenly rotated in the one angular direction.

15. The apparatus of claim 14 further characterized in that the last mentioned means includes a plunger movable between the last mentioned first and second positions, and also between a third position out of driving engagement with the said other of the ring gear and ring gear portion, and a fourth position in driving engagement with the other of the ring gear and ring gear portion, means for resiliently urging the plunger to its fourth position when the plunger is in either of its first and second positions and means mounted on the plunger to act in cooperation with the mount to retain the plunger in the selected one of its first and second positions while permitting the plunger to move between its third and fourth positions.

16. The apparatus of claim 15 further characterized in that the mount is mounted on the ring gear and the ring gear portion has an axially opening aperture for the plunger to move into when the plunger moves from its third position to its fourth position.

17. Apparatus for use in drivingly rotating a driven member, comprising a frame, annular means mounted on the frame to rotate about an axis of rotation for drivingly engaging the driven member, said annular means having an annular portion, said annular portion having an axial aperture, a ring gear rotatably mounted by the annular means and having a ring portion in axial alignment with the annular portion, power operated means mounted on the frame for drivingly rotating the ring gear in one angular direction and alternately in an opposite angular direction, axially movable means mounted on the ring gear for movement between a first position extending into said aperture for drivingly connecting the ring gear to the annular means when the ring gear is driven in said one angular direction and a second position out of the aperture out of driving relationship to the annular portion, the axially movable means having a camming surface abuttable against the annular portion for moving the axially movable means to its second position when the ring gear is driven in the opposite angular direction.

18. The apparatus of claim 17 further characterized in that the axially movable means includes means mounted for selective adjustable movement between a third position to drivingly rotate the annular means when the axially movable means is in its first position and the ring gear is rotated in said one angular direction and a fourth position to drivingly rotate the annular means when the axially movable means is in its first position, and the ring gear is rotated in said other angular direction, the means mounted for selective adjustable movement having said camming surface.

19. The apparatus of claim 18 further characterized in that the means mounted for selective adjustable movement includes a plunger movable between a position extended into said aperture and a position out of said aperture, said plunger having said camming surface, and means for resiliently urging the plunger to extend into said aperture.

* * * * *